Sept. 20, 1955    R. G. PIETY ET AL    2,718,449
PULSE MEASURING APPARATUS
Filed Sept. 23, 1949    3 Sheets-Sheet 1

INVENTORS.
R. G. PIETY
F. L. McMILLAN, JR
BY Hudson & Young
ATTORNEYS

Sept. 20, 1955 R. G. PIETY ET AL 2,718,449
PULSE MEASURING APPARATUS
Filed Sept. 23, 1949 3 Sheets-Sheet 2

INVENTORS
R. G. PIETY
F. L. McMILLAN, JR.
BY Hudson & Young
ATTORNEYS

Sept. 20, 1955     R. G. PIETY ET AL     2,718,449
PULSE MEASURING APPARATUS
Filed Sept. 23, 1949
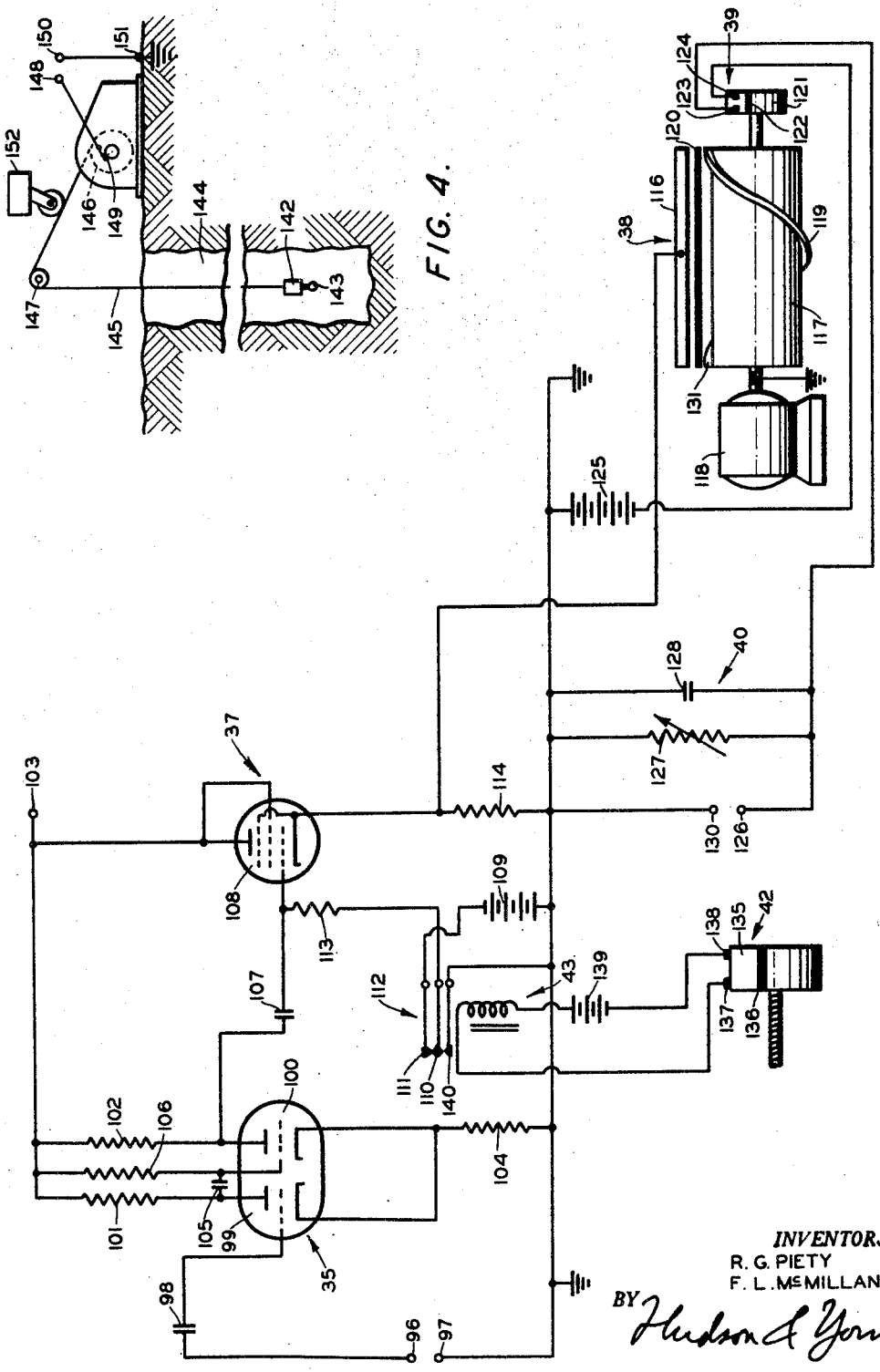
INVENTORS
R. G. PIETY
F. L. McMILLAN, JR.
BY Hudson L. Young
ATTORNEYS

United States Patent Office 2,718,449
Patented Sept. 20, 1955

2,718,449
PULSE MEASURING APPARATUS

Raymond G. Piety and Fred L. McMillan, Jr., Bartlesville, Okla., assignors to Phillips Petroleum Company, a corporation of Delaware Application September 23, 1949, Serial No. 117,338

13 Claims. (Cl. 346—33)

This invention relates to apparatus for producing pulses of electrical energy indicative of the amplitude of a continuous slowly varying signal voltage. In another aspect, it relates to a printing circuit for recording the average value of a pulsating signal voltage. In still another aspect, it relates to a well logging system for recording potentials upon electrodes lowered into a bore hole.

Heretofore, considerable difficulty has been experienced in properly recording voltages produced between a plurality of electrodes which were lowered into a bore hole or of recording the potential of a single electrode suspended in such bore hole. In accordance with this invention, a circuit is provided for producing pulses which are displaced along the time axis from a reference line or voltage wave by an amount which is proportional to the average amplitude of the signal fed to the circuit. This system is particularly adapted for recording the average value of potentials appearing upon electrodes in a bore hole by the use of a printing circuit, which may advantageously utilize a facsimile printer. When so used, an auxiliary circuit may be advantageously provided which produces index marks on the recording medium which are representative of the depth of the electrode-carrying instrument at the time the electrode potentials are measured.

It is an object of the invention to provide an improved circuit for measuring a continuous slowly varying voltage, such as the average amplitude of a pulsating signal.

It is a further object to provide a printing circuit utilizing such a measuring circuit.

It is a still further object to provide a well logging device for producing depth indices upon a recording medium upon which the average amplitude of the signal voltage is displayed.

It is a still further object to provide a circuit which is reliable in operation and uses a minimum number of standard circuit components.

Figure 1:
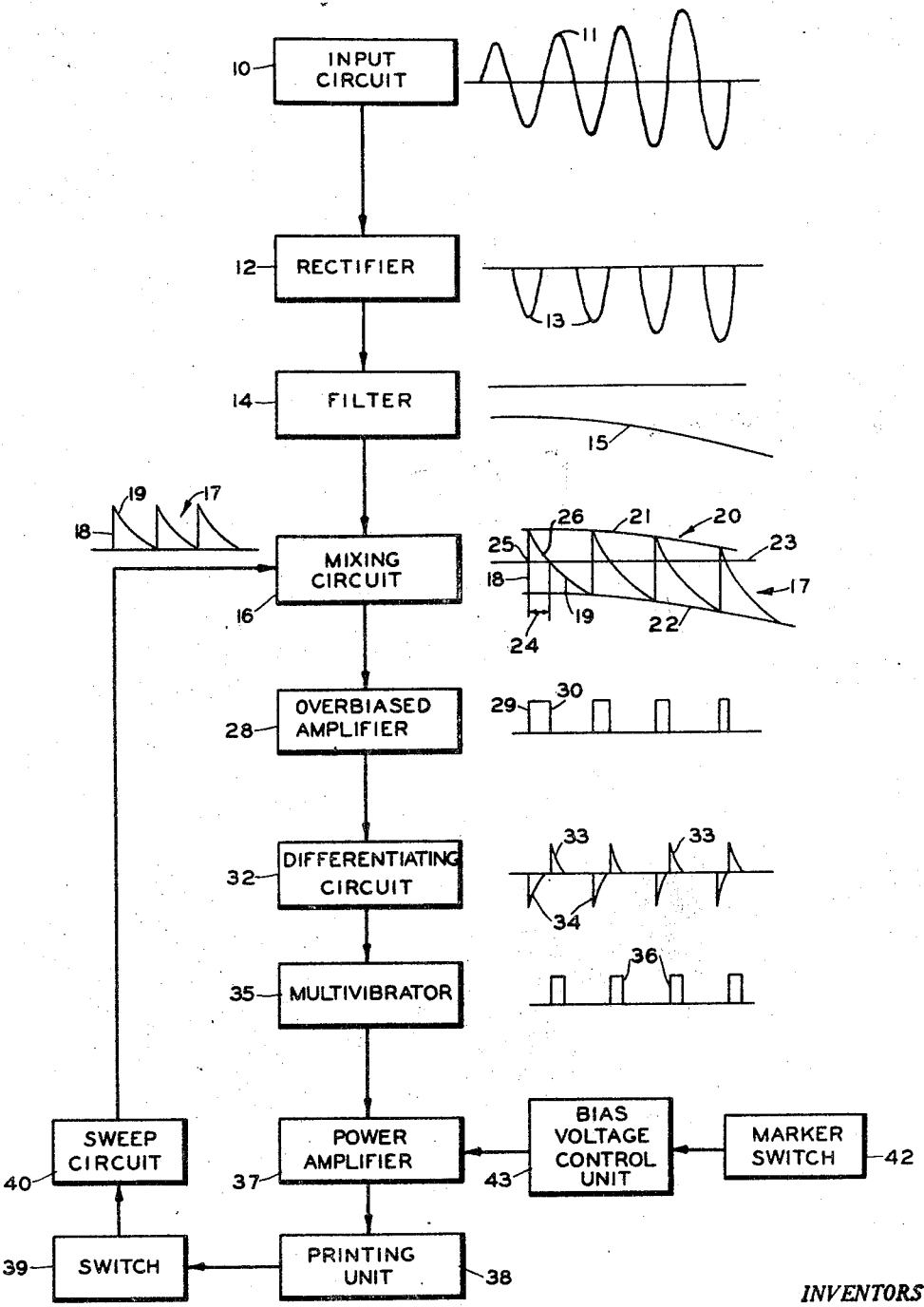
Figure 2:
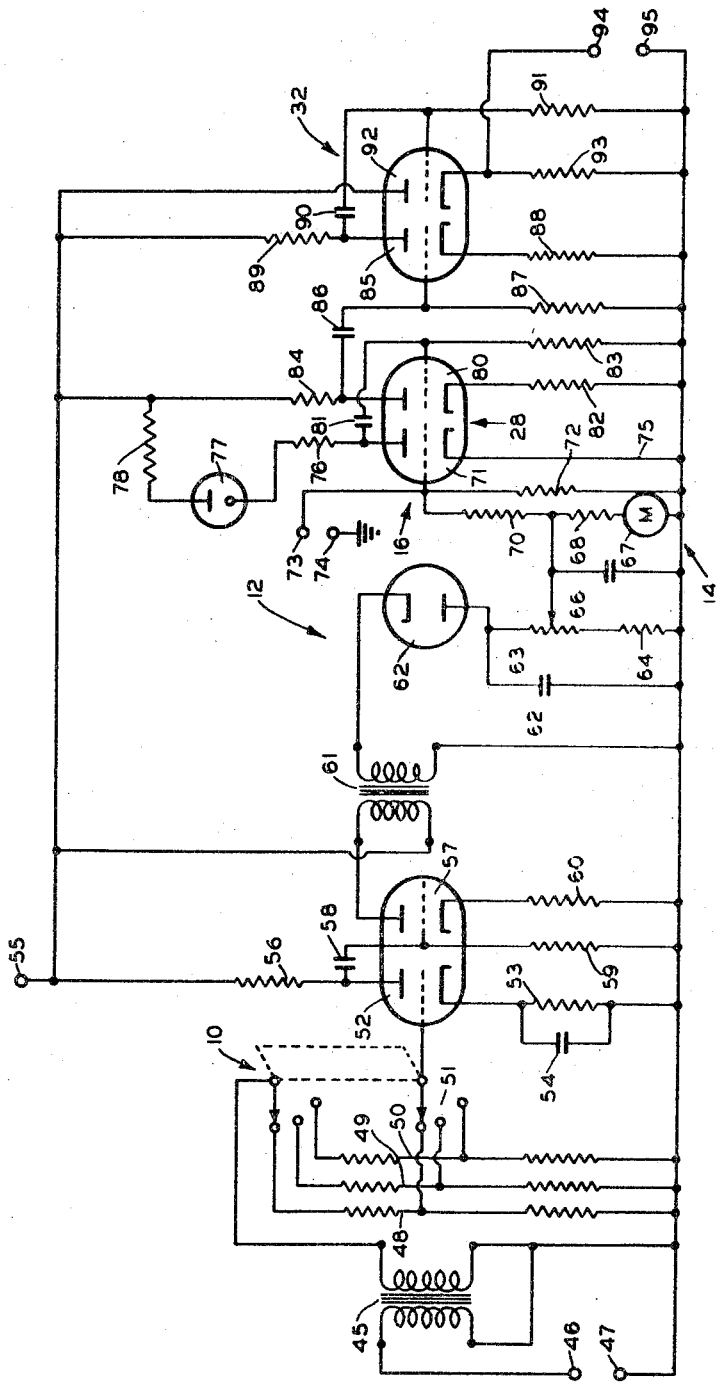

Various other objects, advantages and features of the invention will become apparent from the following detailed description taken in conjunction with the accompanying drawings, in which:

Figure 1 is a block diagram of the voltage-measuring and printing circuit of this invention;

Figures 2 and 3, in combination, are a schematic circuit diagram corresponding to the block diagram of Figure 1; and Figure 4 is a vertical sectional view illustrating a logging device constructed in accordance with this invention.

Referring now to the drawings in detail, and particularly to Figure 1, we have shown an input circuit 10 having a pulsating signal voltage of the nature of sinusoidal wave form 11 of varying amplitude fed thereto. In a preferred embodiment of the invention, the signal 11 represents the voltage appearing upon an electrode suspended in a bore hole, or alternatively, the voltage developed between two or more electrodes in a bore hole, the amplitude of this voltage varying with the resistivity of the formation adjacent the electrodes. This voltage may advantageously have a frequency in the neighborhood of 400 cycles per second. However, the input voltage 11 may also represent any desired pulsating signal voltage, either alternating current or direct current, whose average amplitude is to be measured or recorded. A rectifier 12 is fed by the input circuit 10 which eliminates the positive portions of input signal 11 and produces a rectified output represented by graph 13. A filter 14 is fed by the rectifier 12, and this filter produces a voltage represented by graph 15 whose amplitude is equal to the average value of rectified voltage waves 13 and thereby of signal voltage 11. Where the input signal to be measured is a slowly varying voltage of a wave form similar to graph 15, the input circuit 10, rectifier 12, and filter 14 are unnecessary, and may be eliminated.

The output of filter 14 is fed to a mixing circuit 16 where it is combined with a cyclic sweep voltage which is generated in a manner to be hereinafter described, this voltage being represented by graph 17. It will be noted that each cycle of the sweep voltage consists of a steep wave front 18 where the amplitude of the wave changes rapidly and a portion 19 where the amplitude changes slowly. Preferably, the wave front 18 is substantially vertical while the portion 19 is either linear or of exponential form. The combination of the sweep voltage and slowly varying voltage from filter 14 produces a wave form in the mixing circuit which is represented by graph 20. From this graph, it will be noted that the sweep voltage 17 is, in effect, enclosed within an envelope defined by two lines 21, 22 of the same form as graph 15. Line 23 represents a predetermined amplitude, such as a zero voltage. The net effect of combining voltages 15 and 17 is to displace sweep voltage 17 downward from reference line 23 by an amount proportional to the negative value of voltage 15. It will be noted that the distance 24 between the intersection 25 of each wave front 18 with line 23 and the intersection 26 of each flyback portion 19 with line 23 is proportional to the average amplitude of voltage wave 15. That is, if the voltage 15 is of low negative amplitude, line 23 is intersected by the lower portion of wave 17, and distance 24 is large whereas, if the voltage 15 is of high negative amplitude, line 23 is intersected by the upper portion of wave 17, and the distance 24 is small. If flyback portion 19 is linear, the distance 24 is inversely proportional to the amplitude of wave 15 or, if flyback portion 19 is exponential or logarithmic, the distance 24 is inversely proportional to the logarithm of the amplitude of wave 15. Similarly, if flyback portion 19 represents any other function, the distance 24 will represent that function of the amplitude of wave 15. In stating that the distance 24 is proportional to the average signal amplitude, it is understood that direct proportionality or inverse proportionality in accordance with a linear, logarithmic, or any other suitable function is intended. It will be apparent, therefore, that the intersection 26 of flyback portion 19 with line 23 is displaced along the time axis from wave front 18, which may be regarded as a time index, by an amount which is proportional to the amplitude of voltage wave 15.

The output of mixing circuit 16, as represented by voltage 20, is fed to an over-biased amplifier 28. This unit is so constructed that it is fully conductive when the input voltage thereto exceeds a predetermined amplitude, such as that represented by line 23, whereas it is non-conductive when the input voltage is less than such predetermined amplitude. Accordingly, when voltage wave 20 is fed to amplifier 28, it becomes conductive when the amplitude of wave 18 exceeds the predetermined amplitude represented by line 23. This produces a steep leading edge or wave front 29 in the output of amplifier 28. The amplifier then remains fully conductive until the signal voltage falls below such predetermined amplitude at the time represented by the intersection 26 between flyback portion 19 and line 23. Thereupon, the amplifier becomes non-conductive, thus producing a steep trailing edge 30 in the output of the amplifier. Accordingly, the output of amplifier 28 is a series of rectangular waves, the width of each wave being equal to the distance 24 between the two intersections of the corresponding sweep voltage wave with line 23. That is, the width of each rectangular wave is proportional to the amplitude of voltage 15 and its trailing edge 30 is displaced along the time axis from leading edge 29 by a distance which is likewise proportional to the amplitude of wave 15.

The output of amplifier 28 is fed to a differentiating circuit 32 which produces a sharp voltage pulse 34 each time the leading edge 29 of a rectangular wave is fed thereto and a sharp voltage pulse 33 of opposite polarity each time the trailing edge 30 of a rectangular wave is fed thereto. The pulses 33, of course, are displaced along the time axis from their corresponding pulses 34 by an amount which is proportional to the width of the rectangular waves fed thereto, and to the amplitude of voltage 15 which, in turn, represents the average amplitude of input signal 11.

The output of differentiating circuit 32 is fed to a multi-vibrator 35 which is responsive to positive pulses 33 but not to negative pulses 34. Accordingly, each pulse 33 produces a rectangular wave 36 which is displaced along the time axis in the same manner as the pulses 33. The rectangular waves 36, of course, represent a larger amount of energy than the sharp voltage pulses 33 which produce them. Hence, these pulses are capable of driving a power amplifier 37 fed by the multi-vibrator 35 whereas the differentiated pulses 33, in many cases, do not have sufficient energy to drive the power amplifier circuits.

The output of power amplifier 37 is fed to a printing unit 38, preferably of the facsimile type. This unit is operated in a cyclic manner and, when an electrical impulse is fed thereto by power amplifier 37, a mark is made upon the recording medium. The printing unit 38 drives a switch 39 which is periodically actuated thereby, preferably at the beginning of each cycle. Switch 39, in turn, actuates a circuit 40 which produces the sweep voltage 17 fed to mixing circuit 16. Preferably, the switch and sweep circuits are so connected that wave front 18 occurs at the beginning of each printing cycle and the declining or flyback portion 19 occurs during the rest of the cycle. As previously stated, the impulse which energizes printing unit 38 is displaced in time from wave front 18 and, hence, from the beginning of the printing cycle by an amount which is proportional to the amplitude of the incoming signal. Accordingly, it will be apparent that, as the printing device passes through repeated cycles of operation, a continuous record is made upon the recording medium of the average amplitude of the incoming signal. If the flyback portion is linear, the record continuously indicates the average amplitude of the signal while, if the flyback portion is logarithmic, the record indicates the logarithm of the average amplitude of the signal. Similarly, if the flyback portion represents any other function of the signal, the printing unit continuously records that function of the average signal amplitude.

In accordance with the invention, a marker switch 42 is provided to form index marks at intervals upon the recording medium. Where the described apparatus is used to record electrode potentials in a bore hole, the marker switch may be advantageously actuated by a depth measuring instrument to cause a mark to be made upon the record at predetermined intervals of depth. The switch 42 actuates a control unit 43 which, in turn, regulates the grid bias applied to an electron tube in power amplifier 37. Accordingly, when the switch 42 is actuated, the amplifier grid is made sufficiently positive that the tube becomes conductive, thus forming an index mark upon the record. In this connection, unit 43 may incorporate a time delay unit so that the tube is made conductive throughout an entire cycle of operation of the printing unit 38. In this manner, the depth index mark will extend completely across the surface of the recording medium so that it is readily distinguishable from the marks produced upon the medium by the input signals fed to the apparatus.

The detailed circuit corresponding to the block diagram of Figure 1 is shown in Figures 2 and 3. Referring now to Figure 2, it will be noted that the input circuit 10 includes an input transformer 45, the primary winding of which is connected to terminals 46 and 47. Where a pulsating signal voltage, such as the voltage fluctuations appearing upon an electrode in a bore hole, is to be measured, the voltage is applied to input terminals 46 and 47. The secondary winding of transformer 45 is shunted by three sets 48, 49, and 50 of fixed resistances, each set including two fixed resistances connected in series. A switch 51 selectively connects the sets of resistors 48, 49, and 50 across the secondary winding of transformer 45, and selectively connects the junctions between the two series resistances of each set to the control grid of a triode 52. This tube functions as an amplifier and, to this end, its cathode is connected to ground through a bias resistor 53 which is shunted by a by-pass condenser 54. The anode of the tube is connected to a positive power supply terminal 55 through a voltage dropping resistor 56, and to the control grid of a triode 57 by a coupling condenser 58, this control grid being connected to ground through a resistor 59. The tube 57 is also connected as an amplifier, its cathode being connected to ground through a bias resistor 60 and its anode being connected to power supply terminal 55 through the primary winding of a coupling transformer 61. Accordingly, an amplified signal voltage appears across the secondary winding of transformer 61, and the gain of the input circuit is regulated by switch 51 in conjunction with the sets 48, 49, and 50 of fixed resistance.

The secondary winding of transformer 61 is connected to the rectifier 12 which includes a diode 62 having its cathode connected to one terminal of the transformer secondary winding, the other terminal of the secondary winding being grounded. The anode of tube 62 is connected to ground through a potentiometer 63 and a fixed resistor 64, these resistors being shunted by a condenser 65. Thus, the diode 62 rectifies the amplified signal voltage appearing across the secondary winding of transformer 61, and this rectified voltage is fed to the filter 14 which includes a filter condenser 66 connected between the contactor of potentiometer 63 and ground together with the resistances 63 and 64. A meter 67 in series with a fixed resistor 68 is connected in shunt with filter condenser 66 to indicate the average signal voltage at this part of the circuit. The voltage appearing at the output of the filter and read by meter 67 is the average value of the signal voltage and has the wave form shown at 15, Figure 1.

The voltage from filter 15 is fed through a resistor 70 to the control grid of a triode 71 which is also connected to ground through a resistor 72. The control grid of tube 71 is also connected to an input terminal 73 associated with a grounded input terminal 74. The cyclic sweep voltage shown by graph 17, Figure 1, is fed to the input terminals 73, 74 and it is combined with the output of filter 14 at the control grid of tube 71. Accordingly, the resistor 70 and input terminals 73, 74 constitute the mixing circuit 16 of Figure 1. If the voltage to be measured is a continuous slowly varying signal, the input circuit 10, the rectifier 12 and the filter 14 may be eliminated. In this case, the continuous slowly varying signal voltage is fed directly to the control grid of tube 71 through resistor 70 where it is combined with the cyclic sweep voltage from terminals 73 and 74. The circuit for generating the sweep voltage as impressed across terminals 73 and 74 will be described hereinafter in detail.

The tube 71 forms a part of the overbiased amplifier 28 of Figure 1, this tube being fully conductive when a voltage of a greater than a predetermined amplitude is impressed upon its control grid and being non-conductive when the control grid voltage is less than such predetermined amplitude. To this end, the cathode of the tube is connected directly to ground by a lead 75 and its anode is connected to positive power supply terminal 55 through a fixed resistor 76, a gas tube 77, and a fixed resistor 78. When the grid voltage exceeds a predetermined amplitude, gas tube 77 is ionized and becomes conductive, thereby permitting a constant current to flow in the anode circuit despite further increase in the grid voltage. When the grid voltage falls below such predetermined amplitude, the triode 71 and gas tube 77 both become non-conductive, thus preventing further flow of current in the circuit. Accordingly, the output of tube 71 consists of a series of rectangular waves, such as shown at 29 and 30, Figure 1, the width of which is proportional to the length of time during which the combined wave form 20 of mixing circuit 16 exceeds the predetermined amplitude represented by line 23. Thus, as previously stated, the width of the rectangular waves is proportional to the average value of the signal voltage.

The output of tube 71 is fed to the control grid of an amplifier triode 80 through a coupling condenser 81, the cathode of the tube being connected to ground through a bias resistor 82, and the control grid being connected to ground through a resistor 83. The anode of tube 80 is connected to positive power supply terminal 55 through a voltage dropping resistor 84 and to the control grid of an amplifier tube 85 through a coupling condenser 86. The cathode and control grid of tube 85 are connected to ground through the respective fixed resistors 87 and 88, the anode of this tube being connected to power supply terminal 55 through a voltage dropping resistor 89.

The amplified rectangular waves appearing at the anode of tube 85, which are reversed in phase by the amplifier circuits, are fed to the differentiating circuit 32 of Figure 1. This circuit consists of a differentiating condenser 90 having one terminal connected to the anode of tube 85 and having its other terminal connected to ground through a resistor 91. The junction between anode 90 and resistor 91 is connected to the control grid of a triode 92, the anode of which is connected directly to positive power supply terminal 55, and the cathode of which is connected to ground through a load impedance 93 which has a pair of output terminals 94 and 95 connected thereacross. Accordingly, the differentiated rectangular waves appear across the output terminals 94 and 95, these waves having the form shown by graphs 33 and 34, Figure 1.

The differentiated signal from terminals 94, 95 is fed to input terminals 96 and 97, Figure 3. Terminal 97 is grounded, and terminal 96 is connected through a coupling condenser 98 to the control grid of a triode 99 which is connected in circuit with a triode 100 to form the multi-vibrator 35 of Figure 1. The anodes of these tubes are connected through voltage dropping resistors 101 and 102, respectively, to a positive power supply terminal 103, the cathodes of the tubes being grounded through a common bias resistor 104. The control grid of tube 100 is connected to the anode of tube 99 by a condenser 105 and to positive power supply terminal 103 through a voltage dropping resistor 106. The negative pulses 34, Figure 1, do not affect the multi-vibrator circuit but each positive pulse 33 applied to the control grid of tube 99 causes it to become conductive, thereby decreasing its anode voltage with the result that the control grid of tube 100 becomes more negative and condenser 105 is charged negatively. Thereupon, tube 100 becomes non-conductive with the result that the voltage abruptly increases at its anode. When condenser 105 is discharged, the control grid of tube 100 again becomes positive since tube 99 is now non-conductive with the result that its anode voltage is increased. Thereupon, tube 100 becomes conductive, thus causing the anode voltage to decrease to its original value. Accordingly, each time the multi-vibrator is triggered by a pulse 33, a rectangular wave is produced at the anode of tube 100, as shown by graph 36, Figure 1.

The rectangular waves from tube 100 are fed through a coupling condenser 107 to the control grid of a pentode 108 which forms a part of the power amplifier 37, Figure 1. A negative bias is ordinarily impressed upon the control grid by a bias battery 109 having its positive terminal grounded and having its negative terminal connected through normally closed contacts 110, 111 of a relay 112, and a resistor 113 to the control grid of pentode 108. The anode and screen grid of tube 108 are connected directly to positive power supply terminal 103 while its cathode and suppressor grid are connected through a load impedance 114 to ground.

The cathode of tube 108 is connected directly to a conductive rod or bar 116 forming a part of the printing unit 38 of Figure 1. The printing unit also includes a drum 117 which is continuously rotated by a motor 118. The drum 117 carries a helix 119 of conductive metal and, when current passes between rod 116 and helix 119, a mark is formed upon a recording medium 120 which is continuously passed between the members 116, 117 by a suitable driving mechanism, not shown. The motor 118 also drives a disc 121 having a conductive strip 122 mounted thereon. A pair of brushes or contacts 123, 124 ride upon the disc 121 and a circuit between these brushes is completed when the strip 122 passes between them. The brush 124 is connected through a battery 125 to ground and the brush 123 is connected to an output terminal 126, a grounded variable resistor 127 and a grounded condenser 128. The output terminal 126 has a grounded output terminal 130 associated therewith, these terminals being connected to the respective terminals 73, 74 of Figure 2. The disc 121 and brushes 123, 124 constitute the switch 39, Figure 1, while the resistor 127, condenser 128 and output terminals 126, 130 constitute the sweep circuit 40 of Figure 1.

When the circuit between brushes 123, 124 is closed, the end portion 131 of helical contact 119 is positioned adjacent rod 116. The described closure of the circuit between brushes 123, 124 charges condenser 128 and produces the steep wave front 18, Figure 1, of cyclic sweep voltage 17. As the drum rotates, successive parts of helical contact 119 are positioned adjacent rod 116 and the sweep voltage decreases exponentially, as indicated by curve 19, Figure 1, due to the discharge of condenser 128 through resistor 127. During each cycle of the sweep voltage, a rectangular wave 29, 30 is produced by amplifier 28, a pulse 33 is produced by differentiating circuit 32, and a rectangular wave 36 is produced by multi-vibrator 35, the displacement along the time axis from wave front 18 of each of these waves being proportional to the average amplitude of the incoming signal. When a rectangular wave from the multi-vibrator is fed to power amplifier 37, a voltage is impressed between rod 116 and helix 119, thereby producing a mark upon the record 120, said mark being displaced rightwardly from the end 131 of the helix a distance which is proportional to the displacement of the corresponding pulses 30, 33, and 36 along the time axis from the wave front 18 of the cyclic sweep voltage. In this connection, it will be noted that the position of the mark upon the record is determined by the amount of angular displacement of the drum 117 from its initial position where end portion 131 is adjacent rod 116. This displacement determines which part of helix 119 is adjacent rod 116. Accordingly, during each cycle of revolution of printing unit 38, a mark is made upon the record 120 which is displaced from the end 131 of helix 119 by an amount which is proportional to the average amplitude of the incoming signal.

In accordance with the invention, we also provide means for making index marks upon the record at pre-selected intervals. To this end, a marker switch 42 is provided consisting of a rotatable disc 135 carrying a strip 136 of conductive metal, this disc having a pair of brushes or contacts 137, 138 in continuous engagement with its surface. These brushes are connected in series with a battery 139 and the energizing coil of relay 112. When the circuit between contacts 137, 138 is closed by conductive strip 136, relay 112 is energized, with the result that contacts 110, 111 are opened and contacts 110, 140 are closed. This removes bias battery 109 from the circuit and connects the control grid of pentode 108 directly to ground through resistor 113. As a result, pentode 108 becomes conductive causing a mark to be made upon recording medium 120. The relay 112 is preferably of the time delay type so that it remains closed for an entire cycle of revolution of the drum 117. In this manner, an index mark is formed throughout the entire width of recording medium 120 when the marker switch is energized. The relay 112 and battery 139 thus constitute the bias voltage control unit 43 of Figure 1.

Where the apparatus is used to record voltages appearing upon one or more electrodes carried by a probe lowered into a bore hole, the switch 42 and control unit 43 may advantageously be utlized to provide depth index marks upon the recording medium. Such as arrangement is shown in Figure 4 wherein a probe 142 carrying an electrode 143 is suspended in a bore hole 144 by a cable 145. The cable is lowered by a windlass 146 over a pulley 147 and an electrical connection is made between electrode 143 and a terminal 148 connected to input terminal 46, Figure 2, by a slip ring 149. A terminal 150 which is connected to terminal 47, Figure 2, is grounded at 151. A depth measuring instrument 152 engages the cable 145 and this instrument is mechanically connected to the disc 135 of Figure 3 so that rotation of this disc is controlled by the depth to which the cable is lowered in the bore hole. As a result, a mark is made upon record 120 each time a predetermined amount of cable is lowered into the bore hole. Further, the average potential existing at electrode 143 is continuously recorded upon the medium 120 by the apparatus of Figures 2 and 3.

We also contemplate that the electrode structure may be of the type disclosed by F. L. McMillan in the copending application Serial No. 88,787, filed April 21, 1949, entitled "Apparatus for Electrical Well Logging," now Patent No. 2,653,294. Although the apparatus has been described in connection with a preferred embodiment thereof, it is to be understood that various types of recording and printing devices, other than those described, may be used without departing from the spirit and scope of the invention. Also the relatively simple sweep circuit 40 may be replaced by more complicated circuits for producing linear, logarithmic, or other types of sweep voltages, as those skilled in the art will understand. Finally, where differentiated pulses 34 have sufficient energy to actuate the printing unit directly, the power amplifier 37 and multi-vibrator 35 may be eliminated. We also contemplate that modifications may be made in the overbiased amplifier and other circuits of the invention without departing from the scope thereof as set forth in the appended claims.

We claim:

1. Apparatus for producing pulses of electrical energy indicative of the average value of a pulsating signal voltage which comprises, in combination, means for producing a voltage representative of the average amplitude of the signal voltage, means for producing a cyclic sweep voltage, each cycle consisting of a steep portion where the voltage changes abruptly, and a portion where the voltage changes gradually, means for mixing said slowly varying voltage and said sweep voltage to produce a resultant voltage, and a circuit fed by said resultant voltage to produce a sharp voltage pulse each time said resultant voltage reaches a predetermined amplitude.

2. Apparatus for producing pulses of electrical energy indicative of the average value of a pulsating signal voltage which comprises, in combination, means for producing a voltage representative of the average amplitude of the signal voltage, means for producing a cyclic sweep voltage of generally saw-tooth wave form, each cycle consisting of a steep wave front and a portion where the voltage decreases gradually in an exponential manner, means for mixing said average voltage and said sweep voltage to produce a resultant voltage, and an overbiased amplifier fed by said mixing means to produce a rectangular wave which is initiated when said resultant voltage rises to a predetermined amplitude and which is terminated when said resultant voltage falls belows said predetermined amplitude, whereby the width of said rectangular waves is proportional to the logarithm of the average value of the amplitude of said pulsating signal voltage.

3. Apparatus for producing pulses of electrical energy indicative of the average amplitude of a pulsating signal voltage which comprises, in combination, means for rectifying and filtering a pulsating signal voltage, means for combining a cyclic sweep voltage with the filtered voltage to produce a resultant voltage, a circuit for producing a rectangular wave which is initiated when said resultant voltage reaches a predetermined amplitude and terminated when said resultant voltage falls below said predetermined amplitude, and a differentiating circuit for producing a sharp voltage pulse of one polarity at the initiation of each rectangular wave and a sharp voltage pulse of opposite polarity at the end of each rectangular wave.

4. Apparatus for producing pulses of electrical energy indicative of the average amplitude of a pulsating signal voltage which comprises, in combination, means for rectifying and filtering a pulsating signal voltage, means for combining a cyclic sweep voltage with the filtered voltage to produce a resultant voltage, a circuit for producing a rectangular voltage wave which is initiated when said resultant voltage reaches a predetermined amplitude and terminated when said resultant voltage falls below said predetermined amplitude, a differentiating circuit for producing a sharp voltage pulse of one polarity at the initiation of each rectangular wave and a sharp voltage pulse of opposite polarity at the end of each rectangular wave, and a multi-vibrator actuated by differentiated pulses of one polarity but unresponsive to differentiated pulses of the opposite polarity.

5. A printing circuit for recording the average value of a pulsating signal voltage which comprises, in combination, means for producing a voltage representative of the average amplitude of the signal voltage, a motor-driven printing unit to form a mark upon a record when actuated by an electrical impulse, a switch driven by said motor and cyclicly actuated thereby, a sweep circuit for producing a cyclic voltage responsive to the operation of said switch, said cyclic sweep voltage consisting of a steep wave front produced at each actuation of said switch and a portion where the voltage changes slowly during the rest of the cycle until the next actuation of said switch, a circuit for mixing said average voltage and said sweep voltage to produce a resultant voltage, means including a trigger circuit for producing a sharp voltage pulse when actuated by a signal of greater than a predetermined amplitude, means for feeding said resultant voltage to said trigger circuit means to produce a sharp voltage pulse which, during each cycle, is displaced along the time axis by an amount proportional to the amplitude of said average voltage, and means for energizing said printing unit in response to said sharp voltage pulses.

6. A printing circuit in accordance with claim 5 in which said switch is connected in circuit with a current source, a condenser, and a resistor, the sweep voltage thereby consisting of a steep voltage rise when the switch is actuated to charge said condenser followed by an exponential drop in voltage as said condenser discharges through said resistor, whereby the pulses fed to the printing unit are representative of the logarithm of the average value of the input signal.

7. A printing circuit for recording the average value of a pulsating signal voltage which comprises, in combination, means for producing a voltage representative of the average amplitude of the signal voltage, a motor-driven printing unit to form a mark upon a record when actuated by an electrical impulse, a switch driven by said motor and cyclicly actuated thereby, a sweep circuit for producing a cyclic voltage responsive to the operation of said switch, said cyclic sweep voltage consisting of a steep wave front produced at each actuation of said switch and a portion where the voltage changes slowly during the rest of the cycle until the next actuation of said switch, a circuit for mixing said average voltage and said sweep voltage to produce a resultant voltage, an over-biased amplifier fed by said mixing circuit to produce rectangular waves, each such wave being initiated when said resultant voltage rises above a predetermined amplitude and terminated when said resultant voltage falls below said predetermined amplitude, a differentiating circuit fed by said amplifier for producing a sharp voltage pulse of predetermined polarity when a wave front of said rectangular wave is incident thereon, said sharp voltage pulse, during each cycle, being displaced along the time axis by an amount proportional to the amplitude of said average voltage, and means for energizing said printing unit in response to said sharp voltage pulses.

8. A printing circuit for recording the average value of a pulsating signal voltage which comprises, in combination, means for producing a voltage representative of the average amplitude of the signal voltage, a motor-driven printing unit to form a mark upon a record when actuated by an electrical impulse, a switch driven by said unit and cyclicly actuated thereby, a sweep circuit for producing a cyclic voltage responsive to the operation of said switch, said cyclic sweep voltage consisting of a steep wave front produced at each actuation of said switch and a portion where the voltage changes slowly during the rest of the cycle until the next actuation of said switch, a circuit for mixing said average voltage and said sweep voltage to produce a resultant voltage, an over-biased amplifier fed by said mixing circuit to produce rectangular waves, each such wave being initiated when said resultant voltage rises above a predetermined amplitude and terminated when said resultant voltage falls below said predetermined amplitude, a differentiating circuit fed by said amplifier for producing a sharp voltage pulse of one polarity at the initiation of each rectangular wave and a sharp voltage pulse of opposite polarity at the termination of each rectangular wave, said pulses of opposite polarity, during each cycle, being displaced along the time axis by an amount proportional to the amplitude of said average voltage, a multivibrator for producing a rectangular pulse responsive to sharp pulses of said opposite polarity, said multivibrator being insensitive to said sharp pulses of one polarity, and means of feeding said rectangular pulses to said printing unit.

9. A printing circuit for recording the average value of a signal voltage of generally sinusoidal wave form which comprises, in combination, a rectifier, means for feeding input signals of sinusoidal wave form to said rectifier, a filter fed by said rectifier, a motor-driven printing unit, a switch driven by said motor, a sweep circuit for producing a cyclic voltage responsive to the operation of said switch, said cyclic sweep voltage consisting of a steep portion produced at each actuation of said switch and a portion where the voltage changes slowly during the rest of the cycle until the next actuation of said switch, a mixing circuit for electrically adding the sweep voltage and the filtered voltage, an overbiased amplifier fed by said mixing circuit, said amplifier being conductive only when the voltage in said mixing circuit is within predetermined amplitude limits, a differentiating circuit fed by said amplifier to produce a sharp voltage pulse of one polarity at the initiation of each conductive period of said amplifier and to produce a sharp voltage pulse of opposite polarity at the termination of each such period, a multivibrator fed by said differentiating circuit and responsive only to pulses of one polarity, a power amplifier fed by said multivibrator, and means for feeding the output of said power amplifier to said printing unit.

10. A printing circuit for recording the average value of a signal voltage of generally sinusoidal wave form which comprises, in combination, means for rectifying and filtering a pulsating signal voltage, means for combining a cyclic sweep voltage with the filtered voltage to produce a resultant voltage, a circuit for producing a rectangular voltage wave which is initiated when said resultant voltage rises above a predetermined amplitude and terminated when said resultant voltage falls below said predetermined amplitude, a differentiating circuit for producing a sharp voltage pulse of one polarity at the initiation of each rectangular wave and a sharp voltage pulse of opposite polarity at the end of each rectangular wave, a multivibrator actuated by differentiated pulses of one polarity but unresponsive to differentiated pulses of the opposite polarity, a power amplifier fed by said multivibrator, said amplifier including an electron tube having an anode, a cathode, and a control grid, means for supplying operating potentials to the electrodes of said tube, a current source for impressing a negative bias upon the control grid of said tube, a source of periodic signals, a switch actuated by the periodic signals from said source to remove the bias from said amplifier tube each time one of said periodic signals occurs, and a printing unit energized by said power amplifier.

11. In a well logging system, in combination, a probe carrying an electrode to measure electrical potentials within a bore hole, a cable for lowering said probe into a bore hole, a switch mechanically connected to said cable, said switch being actuated as each unit length of cable is lowered into the bore hole, a printing unit connected to said electrode for recording potentials measured by said electrode, and means actuated by said switch for energizing said printing unit to record an index representative of the depth of said probe in the bore hole.

12. In a well logging system, in combination, a probe carrying an electrode to measure electrical potentials within a bore hole, a cable for lowering said probe into a bore hole, a switch mechanically connected to said cable, said switch being actuated periodically as the cable is lowered into the bore hole, means for producing a voltage representative of the average amplitude of the voltage picked up by said electrode, a motor-driven printing unit to form a mark upon a record when actuated by an electrical impulse, a set of contacts cyclicly actuated by said motor, a sweep circuit for producing a cyclic voltage responsive to the operation of said contacts, said cyclic sweep voltage consisting of a steep wave front produced at each actuation of said contacts and a portion where the voltage changes slowly during the rest of the cycle until the next actuation of said contacts, a circuit for mixing said average voltage and said sweep voltage to produce a resultant voltage, means for producing a sharp voltage pulse when said resultant voltage reaches a predetermined amplitude, said sharp voltage pulse, during each cycle, being displaced along the time axis by an amount proportional to the amplitude of said average voltage, means for feeding said sharp voltage pulses to said printing unit to be recorded thereby, and means actuated by said switch for periodically operating said printing unit to record an index representative of the depth of said probe in the bore hole.

13. The combination in accordance with claim 5 wherein said last-mentioned means comprises a multivibrator, means for applying said sharp voltage pulses to said multivibrator, an amplifier, means for applying the output signals from said multivibrator to said amplifier, and means to apply the output signals from said amplifier to said printing unit.

References Cited in the file of this patent

UNITED STATES PATENTS

| | | |
|---|---|---|
| 2,088,297 | Koenig | July 27, 1937 |
| 2,271,951 | Pearson et al. | Feb. 3, 1942 |
| 2,281,766 | Hawley | May 5, 1942 |
| 2,401,371 | Pearson et al. | June 4, 1946 |
| 2,412,310 | Young | Dec. 10, 1946 |
| 2,470,028 | Gordon | May 10, 1949 |
| 2,471,168 | Posthumus | May 24, 1949 |
| 2,501,953 | Martin | Mar. 28, 1950 |
| 2,507,351 | Scherbatskoy | May 9, 1950 |
| 2,556,457 | Watts | June 12, 1951 |
| 2,587,319 | Hogan | Feb. 26, 1952 |
| 2,596,118 | Bischoff et al. | May 13, 1952 |